United States Patent
Roh (10) Patent No.: US 7,099,371 B2
(45) Date of Patent: Aug. 29, 2006

(54) METHOD FOR GENERATING AND ALLOCATING CODE PAIRS OF ORTHOGONAL SPREADING CODES

(75) Inventor: Dong Wook Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 888 days.

(21) Appl. No.: 10/029,278

(22) Filed: Dec. 28, 2001

(65) Prior Publication Data

US 2003/0185281 A1    Oct. 2, 2003

(30) Foreign Application Priority Data

Dec. 29, 2000 (KR) ............................... 2000-85036

(51) Int. Cl.
*H04B 1/69* (2006.01)
(52) U.S. Cl. ............... 375/140; 375/138; 375/144; 375/149; 375/316; 375/343; 375/130; 370/503; 370/208; 370/335; 370/347; 370/201
(58) Field of Classification Search ............... 375/140, 375/130, 138, 144, 149, 316, 343; 370/503, 370/208, 335, 347, 201
See application file for complete search history.

(56) References Cited

U.S. PATENT DOCUMENTS

| | | | |
|---|---|---|---|
| 5,629,929 A * | 5/1997 | Blanchard et al. | 370/201 |
| 6,301,287 B1 * | 10/2001 | Walley et al. | 375/140 |
| 6,393,047 B1 * | 5/2002 | Popovic' | 375/140 |
| 6,724,741 B1 * | 4/2004 | Nieczyporowicz et al. | 370/335 |
| 6,751,247 B1 * | 6/2004 | Zhengdi | 375/130 |
| 6,788,730 B1 * | 9/2004 | Richards et al. | 375/138 |
| 6,885,694 B1 * | 4/2005 | He et al. | 375/144 |
| 2002/0172260 A1 * | 11/2002 | Rice | 375/130 |
| 2003/0016733 A1 * | 1/2003 | Cha | 375/149 |
| 2003/0072331 A1 * | 4/2003 | Jou | 370/503 |
| 2004/0081077 A1 * | 4/2004 | Mennekens et al. | 370/208 |
| 2005/0025219 A1 * | 2/2005 | Rice | 375/130 |
| 2005/0068932 A1 * | 3/2005 | Lakkis | 370/347 |

\* cited by examiner

*Primary Examiner*—Stephen Chin
*Assistant Examiner*—Sudhanshu C. Pathak
(74) *Attorney, Agent, or Firm*—Fleshner & Kim LLP (57) ABSTRACT

The present invention relates to an orthogonal spreading code in a code division multiple access (CDMA) mobile communication system, and more particularly, to a method for generating and allocating code or code pairs on the basis of an orthogonal code set, which is generated using orthogonal spreading codes, so as to reduce a peak-to-average power ratio and enlarge the length of an interference free window. In accordance with the invention, at least one orthogonal code set is generated based upon orthogonal spreading codes, one of the at least one orthogonal code set is determined as a representative orthogonal code set, and then the order is allocated according to rules determined based upon the representative orthogonal code set. The codes or code pairs are generated and allocated using the orthogonal spreading codes, so as to reduce a Peak-to-Average Power Ratio or extend the length of an interference free window (IFW).

25 Claims, 4 Drawing Sheets

Fig. 1(Related Art)

LS Code
Spreading

Fig. 2(Related Art)

LS Code
Spreading

Fig. 3

LS Code
Spreading

METHOD FOR GENERATING AND ALLOCATING CODE PAIRS OF ORTHOGONAL SPREADING CODES

BACKGROUND OF THE INVENTION

1. Field of the Invention

The present invention relates to an orthogonal spreading code for a CDMA mobile communication system, and more particularly, to a method for generating and allocating code pairs on the basis of an orthogonal code set, which is generated using orthogonal spreading codes, so as to reduce a peak-to-average power ratio and expand the length of an interference free window or IFW.

2. Description of the Related Art

In general, a Code Division Multiple Access (CDMA) mobile communication system adopts a spread spectrum communication method which uses a spread code with a transmission bandwidth which is much wider than that of an information signal to be transmitted. The spread spectrum communication method uses a wide frequency bandwidth, and thus can regenerate an original signal after despreading which increases the signal power and keeps the noise power low. According to a basic principle of the spread spectrum communication method, when a transmitting block modulates a data multiplied by a spread code to widen the bandwidth of a frequency and then transmits a signal, a receiving block multiplies the signal by the same spread code used in the transmitting block to narrow the bandwidth of the frequency and then demodulates the signal to detect the original signal. In general, the signal received through an antenna of the receiving block includes several kinds of noises mixed thereto in addition to the original signal. However, using the spread spectrum communication method converts the several kinds of noises into very weak electric power via a despreading process because the original signal is changed into a narrow bandwidth while the several kinds of noises are initially multiplied by the spread code to widen the bandwidth and remarkably reduce the interference of the noises when the receiving block multiplies the spread code for despreading.

The spread code used in such spreading and despreading processes can be used for spreading, synchronization and base station discrimination. In other words, autocorrelation and crosscorrelation processes can be executed for spreading, synchronization and base station discrimination. For detection of a desired signal, autocorrelation characteristics are required to have the maximum value when there are no time-offsets and a smaller value when time-offset values are not zero. Also, the crosscorrelation characteristics are required to have small values at all of the time-offsets for discrimination against a spread code used by another user.

In order to meet the foregoing autocorrelation and crosscorrelation characteristics, a conventional CDMA method uses a Pseudo Noise (PN) code together with a Walsh code as spread codes. The PN code satisfies required characteristics in autocorrelation, and the Walsh code satisfies required characteristics in crosscorrelation.

In the characteristics required in crosscorrelation single channel path allows no mutual interference among spreading codes allocated to a number of users. However, the mutual interferences exist among the spread codes having a number of channel paths. More particularly they are as follows:

With single channel path, the amount of mutual interference among the spread codes is determined only by the value of crosscorrelation having no time-offsets. On the contrary, with several channel paths, the amount of crosscorrelation among the spread codes is influenced not only by the crosscorrelation value having no time-offsets but also by the crosscorrelation values which have path delay times among separate channel paths as the time-offsets.

Therefore, in a multi-path channel environment which can be generally referred to as an actual channel environment, the crosscorrelation characteristics among the spreading codes are important not only in no time-offsets but also different time-offsets.

As a result, ideally the crosscorrelation values of the spread codes are required to be 0 at all of the time-offsets. However, it is not known so far about those codes for satisfying the crosscorrelation characteristics and the autocorrelation characteristics at the same time. In other words, referring to the PN and Walsh codes in use for the conventional CDMA method, the PN codes satisfy the required characteristics of autocorrelation while failing to satisfy the required characteristics of crosscorrelation. Also, the Walsh codes fail to meet the required characteristics of autocorrelation while only partially meeting the required characteristics of crosscorrelation. So, referring to the crosscorrelation characteristics of the Walsh codes, the crosscorrelation value is 0 when the time-offsets do not exist, but is not 0 when the time-offsets are not 0.

To solve such drawbacks, one of the orthogonal codes is proposed. The code is called Large Synchronization (LS) code. The LS codes perfectly meet the autocorrelation and crosscorrelation characteristics in a certain time-offset interval. The time-offset interval for perfectly meeting the autocorrelation and crosscorrelation characteristics will be defined as an Interference Free Window (IFW)

Referring to autocorrelation characteristics in the IFW, the autocorrelation value is the maximum where no time-offsets exist, and 0 at any time-offsets in the IFW where the time-offsets are not 0. Also, according to the crosscorrelation characteristics of the LS codes, the crosscorrelation value is 0 at any time-offsets in the IFW.

As a result, in the multi-path channel environments where the path delay time-offsets among the channel paths exist in the IFW, the interference among the spreading codes allocated to users can be removed. Therefore, the time-offset interval satisfying the foregoing autocorrelation and crosscorrelation characteristics is referred to as the Interference Free Window or IFW.

Conventionally, the PN codes and the Walsh codes partially satisfy the characteristics required in autocorrelation and crosscorrelation at the time-offsets in the IFW, whereas the orthogonal spreading codes perfectly satisfy the characteristics required in autocorrelation and crosscorrelation at the time-offsets in the IFW.

Although the orthogonal spreading codes have the autocorrelation and crosscorrelation characteristics excellent at the time-offsets in the IFW, however, there is a drawback that only a small number of codes are available in practice: i.e., the number of available orthogonal spreading codes decreases as the length of the IFW interval increase.

When a set of the orthogonal spreading codes satisfying the foregoing autocorrelation and crosscorrelation characteristics is defined as an orthogonal code set, the length of the IFW interval is inversely proportional to the number of elements in the orthogonal code set. When the length of the IFW interval increases as set forth above, the interference is proportionally reduced. However, the available number of orthogonal codes is restricted, thereby resulting in restriction of channel capacity.

Figure 1:
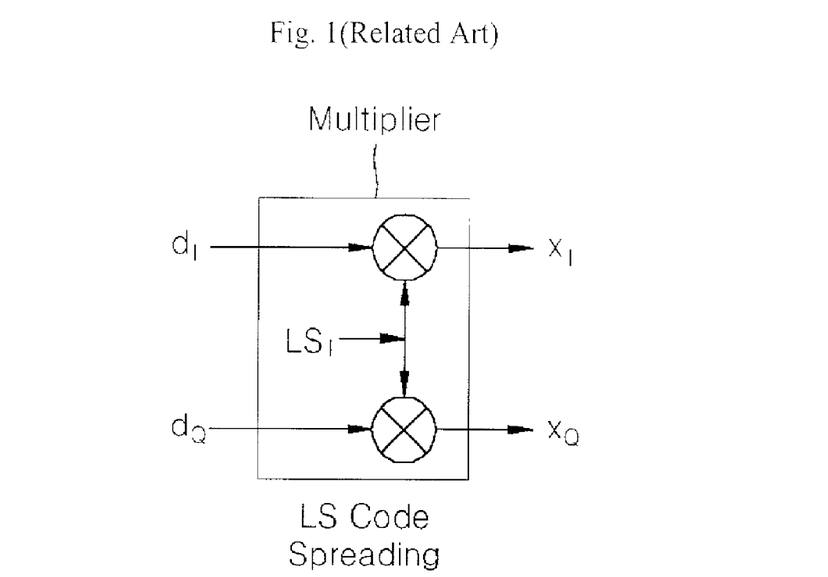
FIG. 1 schematically shows a BPSK spreading method using an orthogonal a spreading code of the related art.
Figure 2:
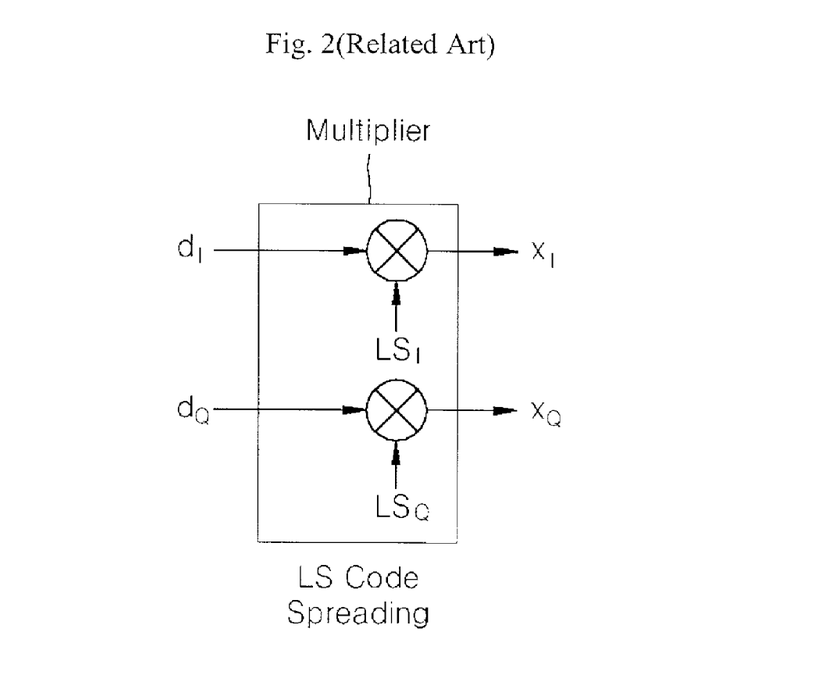
FIG. 2 schematically shows a QPSK spreading method using an orthogonal spreading code of the invention.
Figure 3:
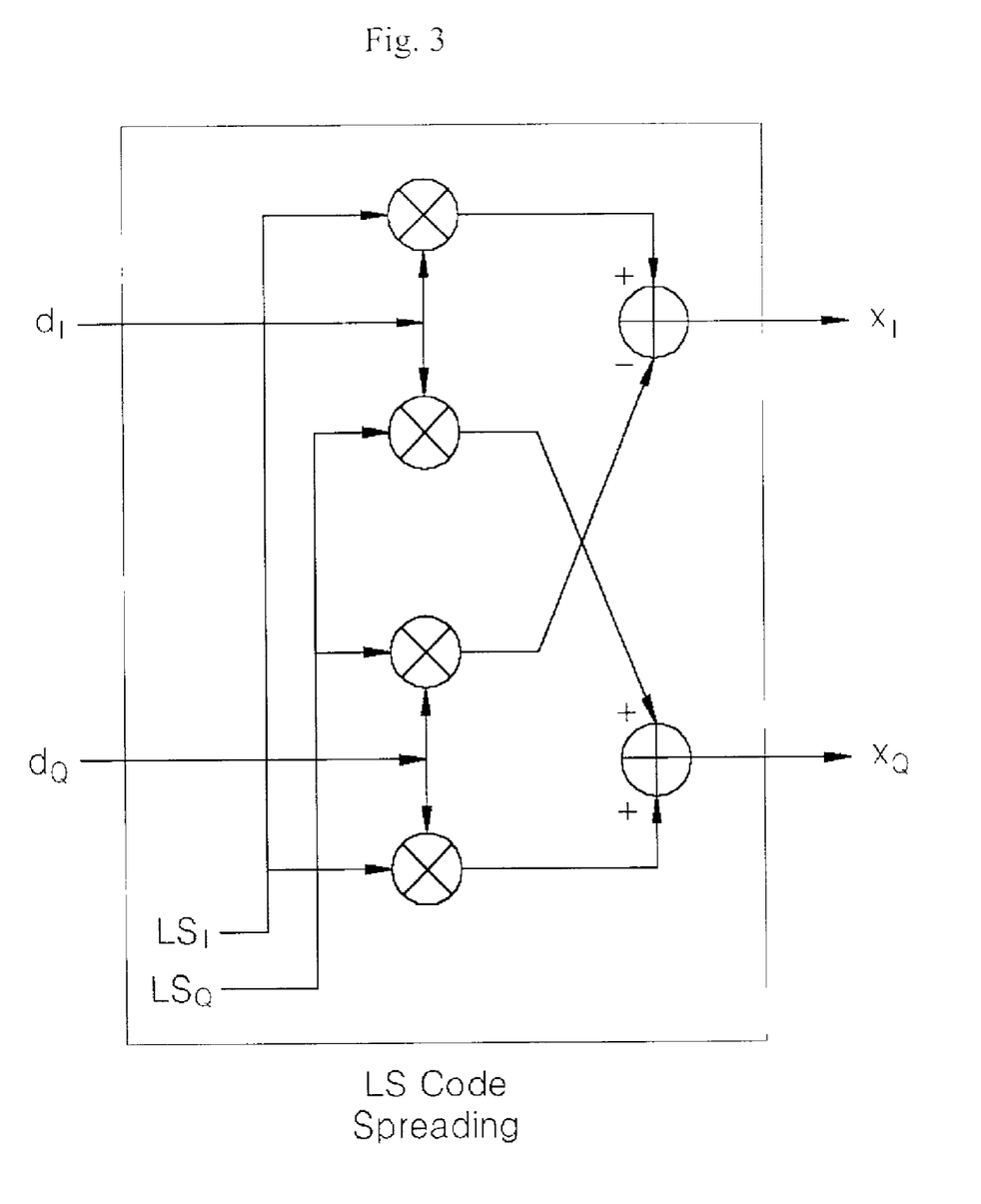
FIG. 3 schematically shows a complex spreading method using an orthogonal spreading code of the invention.

A number of spreading methods using the orthogonal spreading, codes have been proposed, and examples thereof include: a Binary Phase Shift Keying (BPSK) spreading method in which the same orthogonal spreading code is used in both I branch and Q branch (FIG. 1), a Quadrature Phase Shift Keying (QPSK) spreading method in which different orthogonal spreading codes are respectively allocated to the I branch and the Q branch (FIG. 2), and a complex spreading method for reducing the power imbalance between the I and Q branch (FIG. 3).

However, if different orthogonal spreading are respectively allocated to the I branch and the Q branch in carrying out the spreading methods, the spreading codes of the I branch and the spreading codes of the Q branch can be simultaneously varied, and thus the spread signals may undergo a phase transition of 180 degree. Such a phase transition of 180 degree has a negative influence on the envelope fluctuation of the spreaded signals after passing through a filter, thereby increasing a Peak-to-Average Power Ratio (PAPR).

SUMMARY OF THE INVENTION

Accordingly, the present invention has been devised to solve the foregoing problems, and it is therefore an object of the invention to provide a method for generating and allocating code pairs based upon an orthogonal code set generated from orthogonal spreading codes.

It is another object of the invention to provide a method for generating code pairs, which minimize phase transition, when different orthogonal spreading codes are respectively allocated to I branch and Q branch.

It is further another object of the invention to provide a method for generating code allocation order when the same orthogonal spreading code is allocated to I branch and Q branch.

It is still another object of the invention to provide a method for generating orthogonal code sets satisfying autocorrelation and crosscorrelation characteristics based on orthogonal spreading codes.

According to an aspect of the invention to obtain the foregoing objects, a code pair allocating method using orthogonal spreading codes comprises the following steps of: generating at least one orthogonal code set using the orthogonal spreading codes; determining one of the at least one orthogonal code set as a representative orthogonal code set; matching the orthogonal spreading codes to at least one element included in the representative orthogonal code set in the ascending order; judging whether to differently allocate the orthogonal spreading codes corresponding to the at least one element of the representative code set to an I branch and a Q branch; judging whether to allocate code pairs which minimize a peak-to-average power ratio if differently allocated; and allocating the order according to a rule determined from the representative orthogonal code set.

In the code pair allocating method using orthogonal spreading codes in accordance with the invention, the step of generating the orthogonal code set comprises the steps of: generating the orthogonal spreading codes corresponding to a selected code length; adjusting the length of an IFW based upon a selected code component length; and generating the at least one orthogonal code set and at least one element included in each of the at least one orthogonal code set until a certain condition is satisfied.

According to another aspect of the invention, when the same orthogonal spreading code is allocated to both I branch code and Q branch code, the code allocating method using orthogonal spreading of the invention further comprises the following steps of: generating at least one code set using the representative code set; selecting the at least one code set in a predetermined order; allocating the order of the codes according to a predetermined order using at least one element of the selected code set.

According to further another aspect of the invention, when the different orthogonal spreading codes are allocated to I branch code and Q branch code respectively, the code pair allocating method using orthogonal spreading of the invention further comprises the following steps of: judging whether to minimize a peak-to-average power ratio; generating at least one code pair using the representative code set if a code pair is allocated to minimize a peak-to-average power ratio; generating a code pair set using the at least one code pair; allocating the code order based upon the at least one code pair included in the code pair set; grouping at least one code pair set according to a rule determined based upon the representative code set if the code pair is not allocated to minimizes the peak-to-average power ratio; selecting one from the at least one code pair set according to the determined order; generating at least one code pair on the basis of at least one element included in the selected code pair set; and allocating the code order based upon the at least one code pair.

According to still another aspect of the invention, an orthogonal code set generating method using orthogonal spreading codes comprises the following steps of: generating orthogonal spreading codes corresponding to a selected code length; adjusting the interval of the length of an IFW based upon a selected code component length; and if the interval of the IFW length is adjusted, generating at least one orthogonal code set based upon the orthogonal spreading code.

Figure 5:
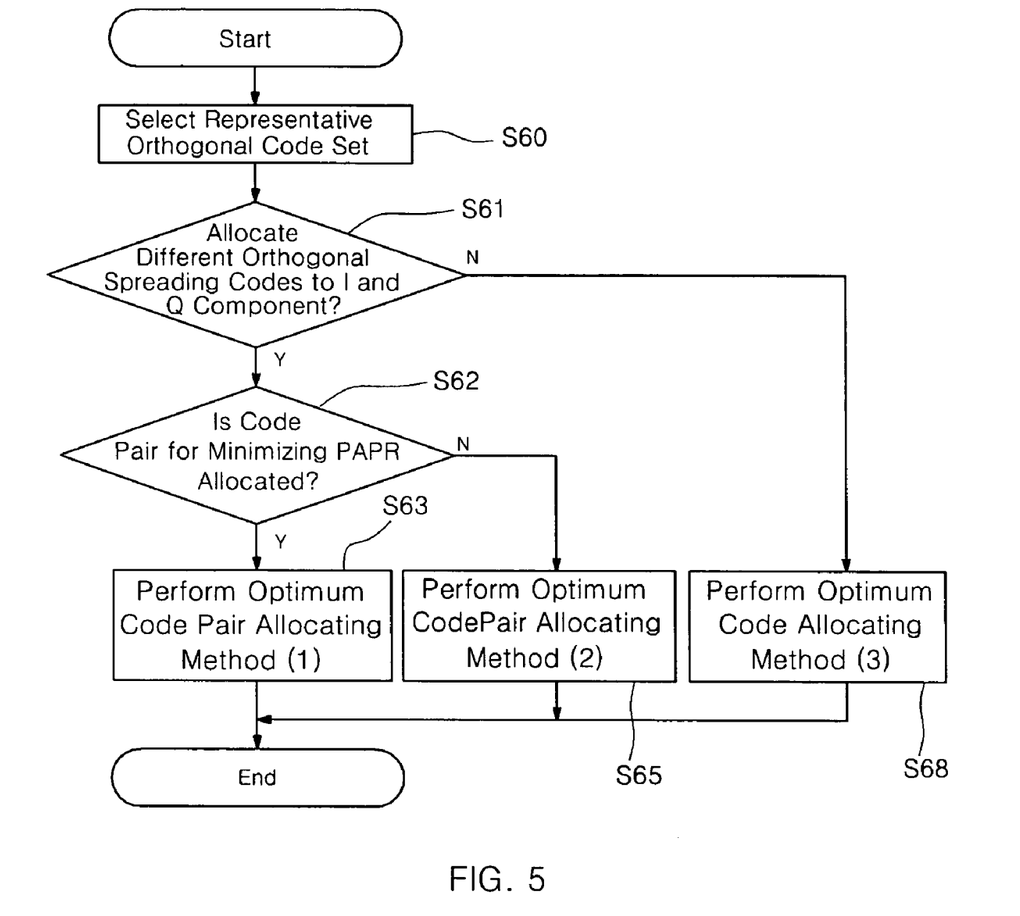
FIG. 5 is a flow chart illustrating a method of allocating a code pair using a representative orthogonal code set according to a preferred embodiment of the invention.

According to further another aspect of the invention, a code pair allocating method using orthogonal spreading codes comprises the following steps of: determining one of at least one orthogonal code set as a representative orthogonal code set; allocating different orthogonal spreading codes to an I branch and a Q branch and judging whether to minimize a peak-to-average power ratio; generating at least one code pair using the representative orthogonal code set according to a result of the judging S 62 in FIG. 5; generating a code pair set based upon the at least one code pair; and allocating the code order based upon the at least one code pair included in the code pair set.

According to still another aspect of the invention, a code pair allocating method using orthogonal spreading codes comprises the following steps of determining one of at least one orthogonal code set as a representative orthogonal code set; allocating different orthogonal spreading codes to an I branch and a Q branch, and judging whether to minimize a peak-to-average power ratio; grouping at least one code pair set according to a rule determined based upon the representative orthogonal code set as a result of the judging S 62 in FIG. 5; selecting one from the at least one code pair according to a determined order; generating at least one code pair on the basis of the middle of at least one element included in the selected code pair set; and allocating the code order based upon the at least code pair.

According to other aspect of the invention, a code pair allocating method using orthogonal spreading codes comprises the following steps of: determining one of at least one orthogonal code set as a representative orthogonal code set; judging whether to allocate the orthogonal spreading code to an I branch and a Q branch; generating at least one code set by using the orthogonal code set according to a result of the judging S 61 in FIG. 5; selecting the at least one code set in a predetermined order; and allocating the code order according to a predetermined rule based upon at least one element of the selected code set.

DETAILED DESCRIPTION OF THE INVENTION

The following detailed description will present an embodiment of the invention in reference to the accompanying drawings.

First, an orthogonal code set is defined as a set of orthogonal spreading codes satisfying autocorrelation and crosscorrelation characteristics in a required IFW.

The orthogonal spreading codes are defined as in Equation 1, wherein the code length N is $2^m$, and m is a natural number at least 2:

$$LS^N = \begin{bmatrix} C^N & S^N \\ C^N & -S^N \end{bmatrix} = \begin{bmatrix} LS_0^N \\ \vdots \\ LS_K^N \\ \vdots \\ LS_{N-1}^N \end{bmatrix}. \quad \text{Equation 1}$$

Herein, $LS^N$ is an orthogonal spreading code matrix, $LS_K^N$ is a row vector having a size of 1×N representing the Kth orthogonal spreading code, $C^N$ and $S^N$ are sub-matrices respectively having a size of $$\frac{N}{2} \times \frac{N}{2},$$

and K is 0 to N−1. $S^N$ is recursively obtained from $C^N$, and $C^N$ is recursively obtained from $$C^{\frac{N}{2}}.$$

Meanwhile, when a guard component $L_{GUARD}$ having a size of $$\frac{N}{2} \times L_{GUARD}$$

inserted after or before $C^N$ and $S^N$ for generating the IFW, an orthogonal spreading code can be expressed as in Equation 2, wherein the length of a code is $N+2\times L_{GUARD}$, N is a natural number at least 2, and the length of guard component is an integer at least 0.

$$LS^{N+2\times L_{GUARD}} = \begin{bmatrix} 0^{L_{GUARD}} & C^N & 0^{L_{GUARD}} & S^N \\ 0^{L_{GUARD}} & C^N & 0^{L_{GUARD}} & -S^N \end{bmatrix} \quad \text{Equation 2}$$

$$= \begin{bmatrix} LS_0^{N+2\times L_{GUARD}} \\ \vdots \\ LS_K^{N+2\times L_{GUARD}} \\ \vdots \\ LS_{N-1}^{N+2\times L_{GUARD}} \end{bmatrix}.$$

Herein, $LS^{N-2/L_{guard}}$ is the orthogonal spreading code matrix. $LS_K^{N+2/L_{GUARD}}$ is a row vector expressing the Kth orthogonal spreading code having a size of 1×(N+2×$L_{GUARD}$). Also, $O^{L_{GUARD}}$ is a row vector having a value of 0 and a size of $$\frac{N}{2} \times L_{GUARD}.$$

If the IFW of the orthogonal code has an interval of $[-L_{IFW}, L_{IFW}]$, the number of the orthogonal spreading codes is $2^{m-g}$ when $2^{g-1} \leq L_{IFW} \leq 2^g$. Herein, g is a natural number, m is a natural number at least 2, $L_{IFW}$ and $L_{GUARD}$ have the following relation:

$$L_{GUARD} \geq L_{IFW} \geq 0.$$

The following detailed description will present a code allocating method for increasing the length of the IFW and a code pair generating method for minimizing the phase transition of 180 degree among the codes allocated to I branch and the codes allocated to Q branch to minimize a Peak-to-Average Power Ratio (PAPR).

Generation of Orthogonal Code Set

Equation 2 shows that total $2^g$ number of orthogonal code sets (O) as sets of mutually orthogonal codes exist, and each of the orthogonal code sets includes $2^{m-g}$ number of elements.

Therefore, the orthogonal code sets can be expressed as in Equation 3:

$$O_1 = \{LS_0^{N+2\times L_{GUARD}}, LS_1^{N+2\times L_{GUARD}}, \ldots, LS_{2^{m-g}-1}^{N+2\times L_{GUARD}}\}.$$

$$O_2 = \{LS_{2^{m-g}}^{N+2\times L_{GUARD}}, LS_{2^{m-g}+1}^{N+2\times L_{GUARD}}, \ldots, LS_{2^{m-g}+2^{m-g}-1}^{N+2\times L_{GUARD}}\}.$$

..,
..,
.., $$O_K = \{LS_{(K-1)\times 2^{m-g}}^{N+2\times L_{GUARD}}, LS_{(K-1)\times 2^{m-g}+1}^{N+2\times L_{GUARD}}, \ldots, LS_{(K-1)\times 2^{m-g}+2^{m-g}-1}^{N+2\times L_{GUARD}}\}.$$

..,
..,
.., and

As shown in Equation 3, the total $2^g$ number of orthogonal code sets exist from $O_1$ to $O_{2^g}$. Therefore, the same autocorrelation and crosscorrelation characteristics can be expressed even if any one is selected from the orthogonal code sets. However, all of the orthogonal code sets are not used at the same time, but only one set is used. In other words, if the orthogonal code set $O_1$ is used, the remaining orthogonal code sets are not used by the following reason: When several orthogonal code sets are used at the same time, the autocorrelation and crosscorrelation characteristics are not maintained in the IFW.

Therefore, when a representative orthogonal code set is shown as L, each of element in the set is defined as: $L=\{l_0, l_2, \ldots, l_2^{n-2}, l_2^{ng-1}\}$. Then, each elements between the orthogonal code sets $O_k$ and the representative orthogonal code set L can be one-to-one matched in the ascending order.

In other words, the representative orthogonal code set is $L=O_1$ when $O_1$ is selected as the orthogonal code set. Then elements in the orthogonal code set can be expressed as in Equation 4:

$$l_0 = LS_0^{N+2}{}_L^{GUARD}$$

$$l_1 = LS_1^{N+2}{}_L^{GUARD}$$

.,

.,

... and $$l_{2^{m-g}-1} = LS_{2^{m-g}-1}^{N+2 \times L_{GUARD}}. \quad \text{Equation 4}$$

Therefore, the representative orthogonal code set can be expressed as $$L=O_1=\{l_0, l_1, \ldots, l_2^{m-g}-1\}.$$

When $O_k$ is selected as the orthogonal code set, the representative orthogonal code set becomes $L=O_k$, and the element in the orthogonal code set can be expressed as in Equation 5:

$$l_0 = LS_{(K-1) \times 2^{m-g}}^{N+2 \times L_{GUARD}},$$

$$l_1 = LS_{(K-1) \times 2^{m-g}+1}^{N+2 \times L_{GUARD}},$$

As a result, in order to generate the IFW, the orthogonal code sets can be generated by using the orthogonal spreading codes, which include the guard components according to Equations 2, 3 and 5.

As described above, spreading methods using the orthogonal spreading codes include: a Binary Phase Shift Keying (BPSK) spreading method in which the same I orthogonal spreading code is used in both I branch and Q branch (FIG. 1), a Quadrature Phase Shift Keying (QPSK) spreading, method in which different orthogonal spreading codes are allocated to the I branch and the Q branch (FIG. 2), and a complex spreading method for reducing the power imbalance between the I and Q branch (FIG. 3).

The following description will present a method for generating the optimum code pairs and allocating the codes using the orthogonal code sets. For convenience's sake, firstly the description will be made about a situation in which different orthogonal spreading codes are used in the I and Q branch, and then a situation in which the same orthogonal spreading code is used in the I and Q branch.

Optimum Code Pair Allocation (Using Different Spreading Codes)

(1) Minimizing the PAPR (S 63 in FIG. 5)

As described above, when the different spreading codes are used in each of the I component and the Q component, the spreading codes of the I and Q component can be varied simultaneously. Then the spreaded signal may undergo a phase transition of 180 degree, thereby increasing the Peak-to-Average Power Ratio (PAPR). Therefore, when the different orthogonal spreading codes are used in each of the I and Q branch, code pairs are so generated to minimize the 180 degree phase transition of each signal. In other words, when the orthogonal spreading codes are used for spreading, the optimum code pairs are so selected to minimize the 180 degree phase transition between the I and Q branch codes in selecting each spreading code pair ($I_{branch}$ code, $Q_{branch}$ code) or ($Q_{branch}$ code, $I_{branch}$ code) in an orthogonal code set.

For example, the code pairs allowing the minimum phase transition of the 180 degree between the I and Q branch codes can be expressed as in Equation 6:

$$(I_{branch}, Q_{branch}) \text{ or } Q_{branch}, I_{branch}) = (l_0, l_{2^{m-g}-1}), \quad \text{Equation 6}$$

$$(l_1, l_{2^{m-g}-1}), (l_2, l_{2^{m-g}-1}),$$

wherein $O_1$ is selected from the orthogonal code sets, and thus the representative set is expressed as: $L=O_1=\{l_0, l_0, \ldots, L_2, l_2^{-1},\}$. If the other orthogonal code set is selected as the representative orthogonal code set, the equation 6 would be changed according to the selected representative orthogonal code set.

Therefore, the code pairs can be generated on the basis of the center of the orthogonal code set which are arrayed in the ascending order. In other words, the first element of the orthogonal code set arrayed in the ascending order is paired with the first element from the center, and the second element of the orthogonal code is paired with the second element from the center. Finally, the element right before the center is paired with the last element of the orthogonal code set. For example, when m is 8 and g is 5, the representative set is $L=O_1=\{l_0,l_1,l_2,l_3,l_4,l_5,l_6,l_7\}$ having 8 elements. Then, the code pairs can be respectively generated as $(l_0,l_4)$, $(l_1,l_5)$, $(l_2,l_6)$, $(l_3,l_7)$.

The generated code pairs can be allocated in the ascending order according to generation. In other words, the first generated code pair $(l_0,l_4)$ is allocated, the next generated code pair $(l_1,l_5)$ is followed, and finally $(l_3,l_7)$ is allocated.

Alternatively, after the orthogonal code sets are grouped into code pair sets, the code pairs are allocated to the code pair sets. In other words, the code pair sets can be indicated P and expressed as in Equations 7 and 8:

$$P=\{(Code_{left}, Code_{right}) \text{ or } (Code_{right}, Code_{left})$$

$$(I_{branch}, Q_{branch}) \text{ or } (Q_{branch}, I_{branch})\} \quad \text{Equation 7, and}$$

$$P=\{(l_0,l_2^{n-x}), (l_1,l_2^{n-x}), (l_2^{n-n},l_2^{n-})\} \quad \text{Equation 8.}$$

Herein, Equations 8 shows the code pair set grouped in reference to Equation 6.

At this time, note that there are no restrictions in the order of allocating the code pairs in the code pair set. Namely, according to which code pair allocation, any code pair can be primarily allocated in the code pair set.

(2) Increasing the length of the IFW (S 65 in FIG. 5)

The invention relates to a method for sequentially allocating orthogonal spreading codes to extend the length of the IFW, in which the length of the IFW is extended when halves of the total available codes or less are used.

Supposing that $O_1$ is selected from the orthogonal code sets and thus the a representative orthogonal code set is indicated as $L=O_1=\{L_0,l_1,\ldots,l_2^{n-g}{}_{-2},l_2^{n-g}{}_{-1}\}$, the code pair set P is defined as Equation 7:

When the halves of the total available codes or less are used, the code pair sets can be grouped into $P_1$ and $P_2$, and each of the code pair sets can be expressed as in Equations 9 and 10.

$$P_1=\{(l_0,l_2^{m-g-2}),(l_1,l_2^m),(l_2^{n-},l_2^{n-})\} \quad \text{Equation 9, and}$$

$$P_2 = \quad \text{Equation 10}$$
$$\{(l_{2^{m-g-1}},l_{2^{n-g-1}-2^{n-g-2}}),(l_{2^{m-g-1}-1},l_{2^{n-g-1}-2^{n-g-2}-1}),$$
$$\ldots,(l_{2^{n-g-1}-2^{n-g-2}-1},l_{2^{n-g}-1})\}.$$

As shown in Equations 9 and 10, the elements of the orthogonal code set, which is arrayed in the ascending order, are divided into halves, in which elements in a lower order are grouped as $P_1$, and elements in the next order are grouped as $P_2$. Generation of code pairs from $P_1$ and $P_2$ can be expressed as in Equation 6. Description will be made in reference to the code pairs from $P_1$.

First, $P_1$ includes those in the lower order up to the center from the elements arrayed in the ascending order. The elements up to the center are paired on the basis of the quarter center; the first element of the orthogonal code set arrayed in the ascending order is paired with the first element from the quarter center; and the second element is paired with the second element from the quarter center. Finally, the element before the quarter center is paired with the last element of the orthogonal code set. Herein, when the elements included in the representative set are N, the center is a portion that is indicated as N/2, and the quarter center is a portion that is indicated as N/4.

As a result, after the halves of the total available codes or less are used, the code pair sets are grouped based upon the orthogonal code sets, one code pair set is selected from at least one code pair sets. The code pairs are allocated based upon the selected code pair set. Herein, in the order of allocating the code pairs, any code pair may be freely allocated to the code pair set.

Therefore, the method for allocating the codes as set forth above has the following effect: when a small number of channels are used and thus the code pair allocation is carried out in one of the code pair sets, the length of the IFW is extended.

(3) Optimum Code Allocation (Using Same Spreading Code) (S 68 in FIG. 5)

The invention is devised to obtain an effect that the length of the IFW is extended when the same spreading code is used in both I and Q branch and the halves of the total available codes (N) or less are used. Herein, it should be noticed that the foregoing code pair generation is unnecessary since the same spreading code is used.

For example, Ad hen the representative set is expressed as $L=\{l_0,l_1,\ldots,l_2^n,l_2^n\}$, code sets can be defined as in Equation 11:

$$L_1=\{l_0,l_1,l_2,l_3\},$$

$$L_2=\{l_4,l_5,l_6,l_7\},$$

$$L_g = \{l_8,l_9,l_{10},l_{11},l_{12},l_{13},l_{14},l_{15}\}, \quad \text{Equation 11}$$

$$L_k = \{l_{2^1},l_{2+1},l_{2+2},\ldots,l_{2^1-2},l_{2-1_{-1}}\},$$

$$L_{m-g-1} =$$
$$\{l_{2^{m-g-1}},l_{2^{m-g-1}+1},l_{2^{n-g-1}+2},\ldots,l_{2^{n-g}-2},l_{2^{m-g}-1}\}.$$

Herein, $L_K$ can be expressed only if K is a natural number from 2 to m−g−1. Therefore, if K is 1, $L_1$ will be defined separately from the foregoing.

Therefore, describing allocation of the codes from Equation 11, one code set is selected from the code sets in the ascending order, and the code can be freely chosen from the selected code set without any fixed order. For example, $L_1$ is primarily selected, and then the codes from $L_1$ is allocated without any fixed order. After allocating all the elements included in $L_1$, $L_2$ is selected to determine the order of allocating elements included in $L_2$. The same process is carried out in the last code set $L_{m-g-1}$ to determine the order of allocation.

Therefore, the method for allocating the codes as set forth above has an effect that the length of the IFW is extended when halves of the total available codes or less are used.

Figure 4:
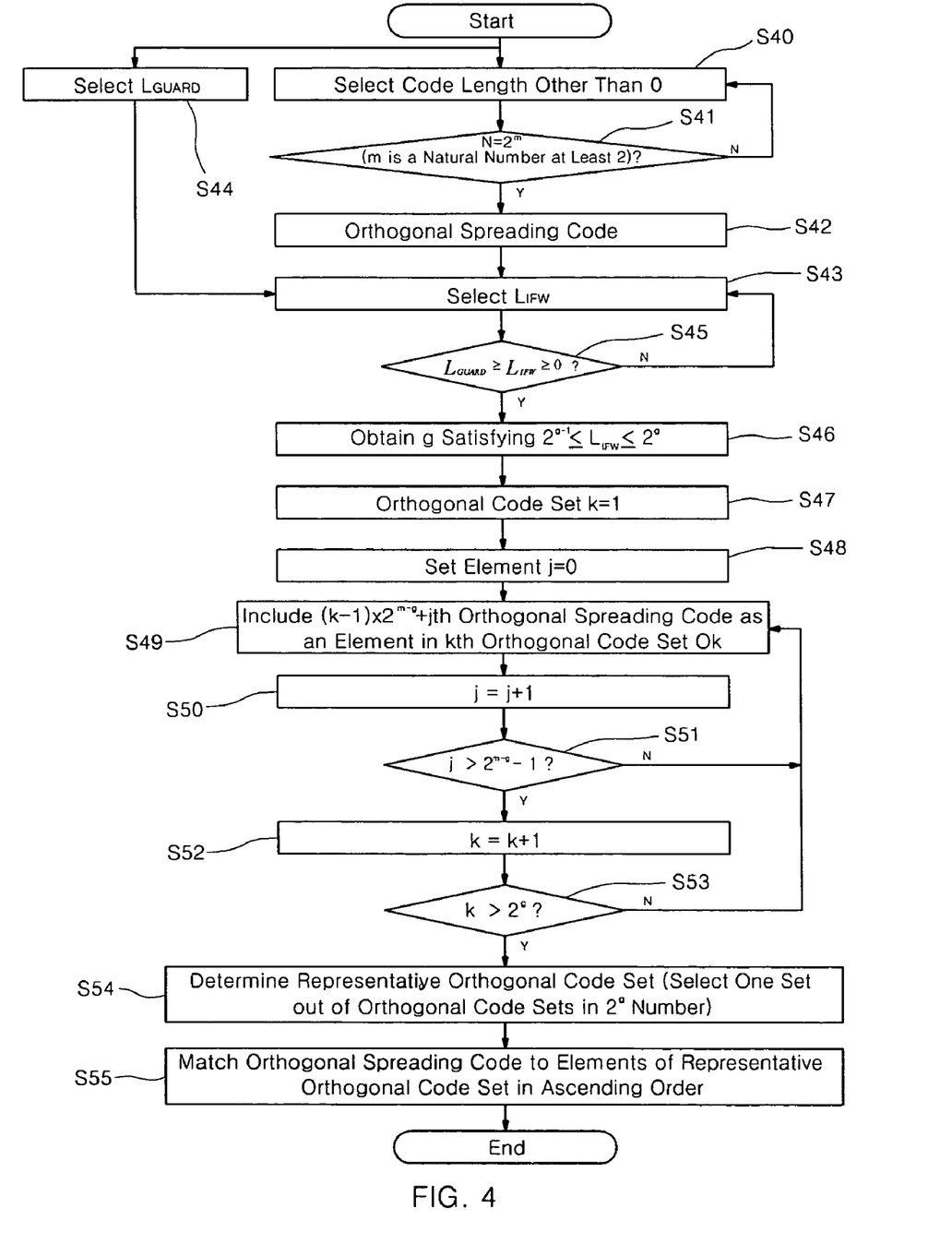
FIG. 4 is a flow chart illustrating a method of generating a representative orthogonal code set using an orthogonal spreading code according to a preferred embodiment of the invention.

FIG. 4 is a flow chart for illustrating a method for generating a representative orthogonal code set using an orthogonal spreading code in accordance with a preferred embodiment of the invention, in which generation of the representative orthogonal code set can be more readily understood in reference to Equations 1 to 5.

Referring to FIG. 4, a given code length N equal or larger than 4 is selected in S 40. When the code length is selected, it is judged whether the code length N is $2^m$ in S 41 wherein in is equal or larger than 2. If it is judged that the code length N is $2^m$, an orthogonal spreading code is generated in S 42. A code component length $L_{GUARD}$ and an IFW length $L_{IFW}$ are respectively selected in S 43 and S 44, and it is judged whether $L_{GUARD}$ and $L_{IFW}$ satisfy the relation $L_{GUARD} \geq L_{IFW} \geq 0$ in S 45. If it is judged that the relation $L_{GUARD} \geq L_{IFW} \geq 0$ is not satisfied, the foregoing S 43 is repeatedly executed until the relation $L_{GUARD} \geq L_{IFW} \geq 0$ is satisfied. If the relation $L_{GUARD} \geq L_{IFW} 0$ is satisfied, execution is made to calculate g satisfying the relation $2^{g-1} \leq L_{IFW} \leq 2^g$ in S 46. If execution is so made that g satisfies the relation $2^{g-1} \leq L_{IFW} \leq 2^g$, k and j are respectively set up as 1 and 0 in order to discriminate the first orthogonal code set and set elements in S 47 and S 48.

The $(k-1) \times 2^{m-g}+j$th orthogonal spreading code is included as a set element to the kth orthogonal code set $O_k$ in S 49.

After adding 1 to j in S 50, it is judged whether j is larger than $2^{m-g}-1$ in S 51. If it is judged that j is not larger than $2^{m-g}-1$, the foregoing S 49 is executed. If it is judged that j is larger than $2^{m-g}-1$ is added to k in S 52. It is judged whether k is larger than $2^g$ in S 53. If it is judged that k is not larger than $2^g$, the foregoing S 49 is executed. If it is judged that k is larger than $2^g$, one orthogonal code set is selected from $2^g$ number of orthogonal code sets to determine a representative orthogonal code set in S 54. Orthogonal code sets as in Equation 3 can be calculated from the foregoing Ss 47 to 53. One of the orthogonal code sets can be determined as the representative orthogonal code set in the foregoing S 54.

The orthogonal spreading codes are matched to elements in the representative orthogonal code set in the ascending order in S 55.

FIG. 5 is a flow chart for illustrating a method for allocating code pairs using a representative orthogonal code set in accordance with a preferred embodiment of the invention.

In S 60, a representative orthogonal code set is determined in the foregoing Ss 54 and 55 in FIG. 4. It is judged whether orthogonal spreading codes corresponding to elements of the representative orthogonal code set are differently allocated to I and Q branch in S 61.

If it is judged that the orthogonal spreading codes are differently allocated (a QPSK or Complex Spreading method), it is judged whether code pairs for minimizing a peak-to-average power ratio are allocated in S 62.

If it is judged that the code pairs for minimizing the peak-to-average power ratio are allocated, an optimum code pair allocating method (1) is executed in S 63. If it is judged that the code pairs for minimizing the peak-to-average power ratio are not allocated, an optimum code pair allocating method (2) is executed in S 65.

Meanwhile, if it is judged that the orthogonal spreading codes corresponding to the elements of the representative orthogonal code set are identically allocated to the I and Q branch (a BPSK method), an optimum code allocating method (3) is executed in S 68.

Each of the foregoing Ss 63, 65 and 68 can be more readily understood in reference to each of the allocation methods (1), (2) and (3).

According to the invention as described hereinbefore, when the orthogonal code sets satisfying the autocorrelation and crosscorrelation characteristics are generated from the orthogonal spreading codes generated in the orthogonal spreading code allocation method, and one set of the orthogonal code sets is set up as the representative code set, the orthogonal spreading codes of the orthogonal code sets are one-to-one matched to the elements of the representative code set in the ascending order.

The code pairs are venerated to minimize the 180 degree phase transition between the I branch and the Q branch based upon the selected orthogonal code set.

Therefore, the invention describes the method for allocating the same or different codes to the I branch and the Q branch based upon selection of the orthogonal code set allocation of the codes and generation of the code pairs According to the invention as described hereinbefore, the 180 degree phase transition between the allocated codes is minimized to reduce the peak-to-average power ratio.

According to the invention, the code pairs and code allocation rules are generated in the orthogonal code set to extend the interval length of the IFW.

The code pairs are generated in the orthogonal code set to extend the length of the interval of the IFW.

The invention generates the orthogonal code sets satisfying the autocorrelation and crosscorrelation characteristics to perfectly remove the interference within the IFW among the codes respectively allocated to the user.

While the foregoing description has been made about the preferred embodiment of the invention, it is apparent that a number of variations, modifications and equivalents can be made without departing from the invention. It is apparent that the invention can be equivalently applied through adequate variation of the foregoing embodiment.

Therefore, the foregoing description shall not restrict the scope of the invention which will be defined by the appended claims.

What is claimed is:

1. A method for allocating code pairs of orthogonal spreading codes having guard bits of 0, comprising:
   generating at least one orthogonal code set based upon the orthogonal spreading codes;
   determining one of the at least one orthogonal code set as a representative orthogonal code set; and
   allocating an order of code pairs according to a prescribed rule based upon the representative orthogonal code set.

2. The method according to claim 1, further comprising matching the orthogonal spreading codes to at least one element included in the representative orthogonal code set in an ascending order if the representative orthogonal code set is determined.

3. The method according to claim 1, wherein said step of generating the orthogonal code set comprises:
   generating the orthogonal spreading codes corresponding to a selected code length;
   adjusting the interval of an Interference Free Window (IFW) length based upon a selected code component length; and
   generating the at least one orthogonal code set and at least one element included in each of the at least one orthogonal code set until a prescribed condition is satisfied.

4. The method according to claim 3, wherein the prescribed condition comprises $2^{g-1} \leq L_{IFW} \leq 2^g$
   wherein:
   $L_{IFW}$ is the length of the interference free window
   g is a natural number.

5. The method according to claim 3, wherein the at least one orthogonal code set is calculated using:

$$O_K = \{LS_{(k-1)\times 2^{m-g}}^{N+2\times L_{GUARD}}, LS_{(k-1)\times 2^{m-g}-1}^{N+2\times L_{GUARD}}, \ldots, LS_{(k-1)\times 2^{m-g}-2^{m-g}-1}^{N+2\times L_{GUARD}}\},$$

wherein $O_k$ is the kth orthogonal code set, and $$LS_{(k-1)\times 2^{m-g}+j}^{N+2\times L_{GUARD}}$$

is the jth orthogonal spreading code of the kth orthogonal code set;
   wherein: $L_{GUARD}$ is the length of guard component
   g & m are natural number(s)
   K is an integer
   N is the code length.

6. The method according to claim 1, further comprising:
   determining whether to differently allocate the orthogonal spreading codes corresponding to the at least one element of the representative code set to an I branch and a Q branch; and
   determining whether to allocate code pairs which minimize a peak-to-average power ratio if differently allocated.

7. The method according to claim 6, further comprising:
   generating at least one code set using the representative code set if the orthogonal spreading codes are not differently allocated to the I branch and the Q branch;
   selecting the at least one code set in a prescribed order; and allocating the order of the codes according to a prescribed rule based upon at least one element of the selected code set.

8. The method according to claim 7, wherein the at least one code set is calculated using:

$$L_k=\{l_{2^k}, l_{2^k+1}, l_{2^k+2}, \ldots, l_{2^{k+1}-2}, l_{2^{k+1}-1}\},$$

wherein $L_k$ is the kth code set, and l is an element included in the code set;
wherein further:
k is an integer.

9. The method according to claim 6, further comprising:
generating at least one code pair based upon the representative code set if the code pair is allocated to minimize the peak-to-average power ratio;
generating a code pair set based upon the at least one code pair; and
allocating the code order based upon the at least one code pair included in the code pair set.

10. The method according to claim 9, wherein the code pair is generated on the basis of a center of the at least one element of the representative code set, and wherein the at least one element is arrayed in the ascending order.

11. The method according to claim 6, further comprising:
grouping at least one code pair set according to a prescribed rule based upon the representative code set if the code pair which minimizes the peak-to-average power ratio is not allocated;
selecting a code pair set from the at least one code pair set according to the determined order;
generating at least one code pair on the basis of the center of the at least one element included in the selected code pair set; and
allocating the code order based upon the at least one code pair.

12. A method for generating an orthogonal code set using orthogonal spreading codes, comprising:
generating orthogonal spreading codes corresponding to a prescribed code length;
adjusting an interval of a length of an interference free window (IFW) based upon a prescribed code component length; and
generating at least one orthogonal code set based upon the orthogonal spreading code if the length of the IFW interval is adjusted.

13. The method according to claim 12, wherein the at least one orthogonal code set is generated until a prescribed condition is satisfied.

14. A method for allocating code pairs using orthogonal spreading codes, comprising:
determining one of at least one orthogonal code set as a representative orthogonal code set;
allocating different orthogonal spreading codes to an I branch and a Q branch, and determining whether to minimize a peak-to-average power ratio;
generating at least one code pair based upon the representative orthogonal code set according to whether the code pair for minimizing a peak-to-average power ratio is allocated;
generating a code pair set based upon the at least one code pair; and
allocating a code order based upon the at least one code pair included in the code pair set, wherein the code pair is generated on the basis of a center of at least one element of the representative orthogonal code set, wherein the at least one element is arrayed in an ascending order.

15. A method for allocating code pairs using orthogonal spreading codes, comprising:
determining one of at least one orthogonal code set as a representative orthogonal code set;
allocating different orthogonal spreading codes to an I branch and a Q branch, and determining whether to minimize a peak-to-average power ratio;
grouping at least one code pair set according to a prescribed rule based upon the representative orthogonal code set in accordance with whether the code pair for minimizing a peak-to-average power ratio is allocated;
selecting a code pair set from the at least one code pair according to a prescribed order;
generating at least one code pair based on a center of at least one element of the representative orthogonal code set and at least one element included in the selected code pair set; and
allocating a code order based upon the at least one code pair.

16. A method for allocating code pairs using orthogonal spreading codes, comprising:
determining one orthogonal set of at least one orthogonal code set as a representative orthogonal code set;
determining whether to identically allocate the same orthogonal spreading code to an I branch and a Q branch;
generating at least one code set by using the orthogonal code set according to whether different orthogonal spreading codes are to be allocated to an I component and a Q component;
selecting the at least one code set in a prescribed order; and
allocating a code order according to a prescribed rule based upon at least one element of the selected code set, wherein the at least one element is arrayed in an ascending order.

17. The method of claim 1, wherein allocating the order of code pairs comprises:
arraying the elements of the orthogonal code set in an ascending order, wherein the ascending order comprises a first element, a center element, an element before center and a last element;
pairing the first element with the center element; and
pairing the element before center with the last element.

18. The method of claim 1, wherein allocating the order of code pairs comprises allocating code pairs in accordance with:

$$P=\{(l_0, l_{2^{m-g-1}}), (l_1, l_{2^{m-g-1}+1}), \ldots, (l_{2^{m-g-1}-1}, l_{2^{m-g}-1})\}$$

wherein $l_j$ is an orthogonal code from the orthogonal code set, "g" is a natural number, and "m" is a natural number greater than 2.

19. The method of claim 1, wherein allocating the order of code pairs comprises:
arraying the elements of the orthogonal code set in an ascending order, wherein the ascending order comprises a first half of elements with a first element, a quarter-center element in the center of the first half of elements, and a last element;
pairing the first element with the first element from the quarter-center element; and
pairing the element before the quarter-center with the last element.

20. The method of claim 1, wherein allocating the order of code pairs comprises allocating code pairs in accordance with:

$$L_{m-g-1} = \{l_{2^{m-g-1}}, l_{2^{m-g-1}+1}, l_{2^{m-g-1}+2}, \ldots, l_{2^{m-g}-2}, l_{2^{m-g}-1}\}$$

wherein a representative orthogonal code set is expressed as:

$$L_i = \{l_0, l_1, \ldots, l_{2^{m-g}-2}, l_{2^{m-g}-1}\}$$

wherein "m" and "g" are natural numbers.

21. A method to generate orthogonal code sets, comprising:
   selecting a code length N equal to or larger than 4;
   determining whether the selected code length N equals $2^m$, where m is equal to or larger than 2;
   generating an orthogonal spreading code if N equals $2^m$;
   selecting a code component length $L_{GUARD}$ and an IFW length $L_{IFW}$;
   determining whether $L_{GUARD} \geq L_{IFW} \geq 0$ is true;
   selecting a new $L_{GUARD}$ and $L_{IFW}$ until $L_{GUARD} \geq L_{IFW} \geq 0$ is true;
   calculating g based on $2^{g-1} \leq L_{IFW} \leq 2^g$ if $L_{GUARD} \geq L_{IFW} \geq 0$;
   setting k equal to 1, and j equal to 0;
   repeat adding the $(k-1)2^{m-g}+j$ orthogonal spreading code to the $k^{th}$ orthogonal code set and adding 1 to j until $j > 2^{m-g}-1$ is true;
   adding 1 to k if $j > 2^{m-g}-1$ is true;
   if $k > 2^g$ is not true, repeat adding the $(k-1)2^{m-g}+j$ orthogonal spreading code to the $k^{th}$ orthogonal code set and adding 1 to k until $k > 2^g$ is true; and
   selecting one orthogonal code set from the generated orthogonal code sets as the representative orthogonal code set if $k > 2^g$ is true;
   wherein: "m" and "g" are natural numbers
   "k" and "j" are integers
   $L_{GUARD}$ is the length of guard component
   $L_{IFW}$ is the length of the interference free window.

22. A method of allocating code pairs using a representative orthogonal code set, comprising:
   determining whether orthogonal spreading codes are to be differently allocated to an I branch and a Q branch or to be similarly allocated to the I branch and the Q branch;
   if orthogonal spreading codes are to be differently allocated, determining whether code pairs to minimize peak-to-average power ratio are to be allocated;
   if orthogonal spreading codes are to be differently allocated to an I branch and a Q branch, and are to be allocated to minimize peak-to-average power ratio, allocate orthogonal spreading codes by:
      arraying the elements of the orthogonal code set in an ascending order, wherein the ascending order comprises a first element, a center element, an element before center and a last element,
      pairing the first element with the center element, and pairing the element before center with the last element;
   if orthogonal spreading codes are to be differently allocated to an I branch and a Q branch and are not to be allocated to minimize peak-to-average power ratio, allocate orthogonal spreading codes by:
      arraying the elements of the orthogonal code set in an ascending order, wherein the ascending order comprises a first half of elements with a first element, a quarter-center element in the center of the first half of elements, and a last element,
      pairing the first element with the first element from the quarter-center element, and
      pairing the element before the quarter-center with the last element;
   if the orthogonal spreading codes are to be similarly allocated to the I branch and the Q branch allocate orthogonal spreading codes by allocating code pairs in accordance with:

$$L = \{l_0, l_1, \ldots, l_{2^{m-g}-2}, l_{2^{m-g}-1}\}$$

wherein a representative orthogonal code set is expressed as:

$$P = \{(l_0, l_{2^{m-g-1}}), (l_1, l_{2^{m-g-1}+1}), \ldots, (l_{2^{m-g-1}-1}, l_{2^{m-g}-1})\}$$

wherein "m" and "g" are natural numbers.

23. The method of claim 22, wherein if orthogonal spreading codes are to be differently allocated to an I branch and a Q branch and are to be allocated to minimize peak-to-average power ratio, allocating code pairs in accordance with:

$$L_{m-g-1} = \{l_{2^{m-g-1}}, l_{2^{m-g-1}+1}, l_{2^{m-g-1}+2}, \ldots, l_{2^{m-g}-2}, l_{2^{m-g}-1}\}$$

wherein "l" is an orthogonal code from the orthogonal code set, "g" is a natural number, and "m" is a natural number greater than 2.

24. An apparatus for generating orthogonal spreading codes, comprising:
   a processor coupled to a memory, wherein the processor and the memory are configured to:
      select a code length N equal to or larger than 4;
      determine whether the selected code length N equals $2^m$, where m is equal to or larger than 2;
      generate an orthogonal spreading code if N equals $2^m$;
      select a code component length $L_{GUARD}$ and an IFW length $L_{IFW}$;
      determine whether $L_{GUARD} \geq L_{IFW} 0$ is true;
      select a new $L_{GUARD}$ and $L_{IFW}$ until $L_{GUARD} \geq L_{IFW} \geq 0$ is true;
      calculate g based on $2^{g-1} \leq L_{IFW} \leq 2^g$ if $L_{GUARD} \geq L_{IFW} \geq 0$;
      set k equal to 1, and j equal to 0;
      repeat adding the $(k-1)2^{m-g}+j$ orthogonal spreading code to the $k^{th}$ orthogonal code set and adding 1 to j until $j > 2^{m-g}$ is true;
      add 1 to k if $j > 2^{m-g}-1$ is true;
      if $k > 2^g$ is not true, repeat adding the $(k-1)2^{m-g}+j$ orthogonal spreading code to the $k^{th}$ orthogonal code set and add 1 to k until $k > 2^g$ is true; and
      select one orthogonal code set from the generated orthogonal code sets as the representative orthogonal code set if $k > 2^g$ is true
   wherein:
   "m" and "g" are natural numbers
   "k" and "j" are integers
   $L_{GUARD}$ is the length of guard component
   $L_{IFW}$ is the length of the interference free window.

25. An apparatus for allocating orthogonal spreading codes using a representative orthogonal code set, comprising:
   a processor coupled to a memory, wherein the processor and the memory are configured to:
      determine whether orthogonal spreading codes are to be differently allocated to an I branch and a Q branch or to be similarly allocated to the I branch and the Q branch;
      if orthogonal spreading codes are to be differently allocated, determine whether code pairs to minimize peak-to-average power ratio are to be allocated;

if orthogonal spreading codes are to be differently allocated to an I branch and a Q branch, and are to be allocated to minimize peak-to-average power ratio:
array the elements of the orthogonal code set in an ascending order, wherein the ascending order comprises a first element, a center element, an element before center and a last element,
pair the first element with the center element, and
pair the element before center with the last element;
if orthogonal spreading codes are to be differently allocated to an I branch and a Q branch and are not to be allocated to minimize peak-to-average power ratio:
array the elements of the orthogonal code set in an ascending order, wherein the ascending order comprises a first half of elements with a first element, a quarter-center element in the center of the fast half of elements, and a last element,
pair the first element with the first element from the quarter-center element, and
pair the element before the quarter-center with the last element;
if the orthogonal spreading codes are to be similarly allocated to the I branch and the Q branch, allocate orthogonal spreading codes in accordance with:

$$L=\{l_0,l_1,\ldots,l_{2^{m-g}-2},l_{2^{m-g}-1}\}$$

wherein a representative orthogonal code set is expressed as:

$$L_{m-g-1}=\{l_{2^{m-g-1}},l_{2^{m-g-1}+1},l_{2^{m-g-1}+2},\ldots,l_{2^{m-g}-2},l_{2^{m-g}-1}\}$$

wherein "m" and "g" are natural numbers.

* * * * *